(12) United States Patent
Lai et al.

(10) Patent No.: US 9,760,542 B1
(45) Date of Patent: *Sep. 12, 2017

(54) PROVIDING CONTEXT-SENSITIVE WRITING ASSISTANCE

(71) Applicant: Sprint Communications Company L.P., Overland Park, KS (US)

(72) Inventors: Harry Hong-Lun Lai, Overland Park, KS (US); Shane Jeremy Landry, Overland Park, KS (US); Kimberly Rae Raddatz, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,121

(22) Filed: Dec. 22, 2016

Related U.S. Application Data

(60) Division of application No. 14/517,537, filed on Oct. 17, 2014, now Pat. No. 9,563,604, which is a continuation of application No. 12/948,292, filed on Nov. 17, 2010, now Pat. No. 8,903,719.

(51) Int. Cl.
| | |
|---|---|
| *G06F 17/21* | (2006.01) |
| *G06F 17/27* | (2006.01) |
| *H04L 29/08* | (2006.01) |
| *H04L 12/58* | (2006.01) |

(52) U.S. Cl.
CPC .......... *G06F 17/21* (2013.01); *G06F 17/273* (2013.01); *G06F 17/276* (2013.01); *G06F 17/2735* (2013.01); *H04L 51/063* (2013.01); *H04L 67/306* (2013.01)

(58) Field of Classification Search
None
See application file for complete search history.

(56) References Cited

U.S. PATENT DOCUMENTS

| | | |
|---|---|---|
| 5,579,224 A | 11/1996 | Hirakawa et al. |
| 5,896,321 A | 4/1999 | Miller et al. |
| 5,970,492 A | 10/1999 | Nielsen |
| 6,785,869 B1 | 8/2004 | Berstis |
| 7,107,204 B1 | 9/2006 | Liu et al. |
| 7,366,500 B1 | 4/2008 | Yalovsky et al. |
| 2002/0163500 A1 | 11/2002 | Griffith |
| 2003/0074410 A1 | 4/2003 | Kay et al. |
| 2003/0149692 A1 | 8/2003 | Mitchell |
| 2004/0044517 A1 | 3/2004 | Palmquist |
| 2004/0078447 A1 | 4/2004 | Malik et al. |
| 2004/0205661 A1 | 10/2004 | Gallemore |
| 2004/0205672 A1 | 10/2004 | Bates et al. |
| 2006/0053001 A1 | 3/2006 | Brockett et al. |
| 2006/0119583 A1 | 6/2006 | Potera |
| 2007/0271089 A1 | 11/2007 | Bates |
| 2008/0052272 A1 | 2/2008 | Altaf |
| 2008/0077406 A1 | 3/2008 | Ganong, III |
| 2009/0306969 A1 | 12/2009 | Goud et al. |

*Primary Examiner* — Jialong He

(57) ABSTRACT

A method, system, and medium for providing context-sensitive writing assistance to a user that is composing a textual communication are described. The context is used to tune the writing assistance to accommodate the different communication styles between users and recipients. The context includes the writing medium, the recipient, and the writer. Examples of writing assistance include spell check, grammar check, and auto-fill in.

20 Claims, 4 Drawing Sheets

PROVIDING CONTEXT-SENSITIVE WRITING ASSISTANCE

CROSS-REFERENCE TO RELATED APPLICATIONS

This application is a continuation of U.S. patent application Ser. No. 12/948,292, now U.S. Pat. No. 9,563,604, filed Nov. 17, 2010, and entitled "PROVIDING CONTEXT-SENSITIVE WRITING ASSISTANCE," which is a divisional of U.S. patent application Ser. No. 14/517,537, now U.S. Pat. No. 8,903,719, filed Oct. 17, 2014, and entitled "PROVIDING CONTEXT-SENSITIVE WRITING ASSISTANCE," which are herein incorporated by reference.

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a specific illustrative aspect, a way of providing context-sensitive writing assistance is provided. The way comprises determining a context of a textual communication that a user is composing. The context comprises a specific recipient to which the textual communication is addressed. The way also comprises selecting one or more dictionaries from a plurality of dictionaries. The one or more dictionaries are selected because they include words that are consistent with a communication style used in previous textual communications addressed to the specific recipient or written by the specific recipient. The way also comprises providing, by way of the computing device, writing assistance that utilizes the one or more dictionaries, thereby tuning the writing assistance to match the communication style, wherein the writing assistance is provided while the textual communication is being composed.

In another aspect, a way of providing context-sensitive writing assistance is provided. The way comprises determining a context of a textual communication that a user is composing. The context of the textual communication comprises a specific recipient of the textual communication and a specific communication medium in which the textual communication is being composed. The way also comprises selecting one or more dictionaries from a plurality of dictionaries. The one or more dictionaries are selected because they include words that are consistent with a communication style used in previous textual communications in the specific communication medium that are addressed to the specific recipient or written by the specific recipient. The way also comprises providing by way of the computing device, writing assistance that utilizes the one or more dictionaries, thereby tuning the writing assistance to match the communication style, wherein the writing assistance is provided while the textual communication is being composed.

In a third aspect, a way of providing context-specific writing assistance is provided. The way comprises providing writing assistance that is tuned to a communication style of a writer of a textual communication presently being composed by the writer. The writing assistance is tuned by using a corpus of words that conform to the communication style associated with the specific recipient in a user's communication profile. The communication profile associates a corpus of words with each of multiple people with which the user has previously communicated in writing. The way also comprises building the user's communication profile by analyzing written communications received from each of the multiple people and sent to each of the multiple people from the user. The communication profile gives more weight to the written communications sent to each of the multiple people. The communication profile associates different corpuses of words for different types of communication mediums on a per-recipient basis, thereby allowing the writing assistance to be tuned to the specific recipient and communication medium.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
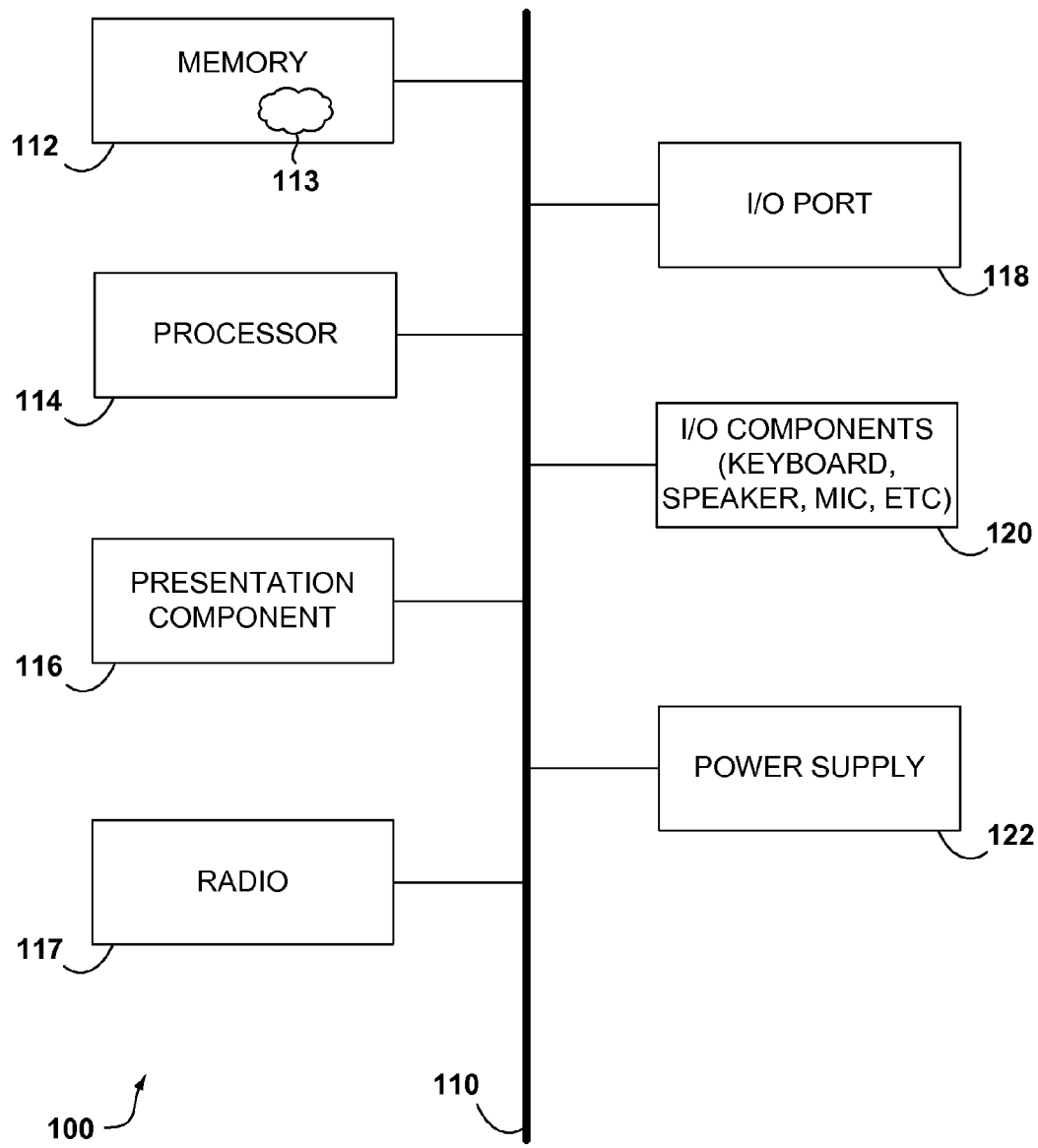
FIG. 1 is a drawing of an illustrative environment in which an embodiment of the present invention operates.

Embodiments of the present invention will be better understood from the detailed description provided below and from the accompanying drawings of various embodiments of the invention. In general embodiments of the present invention are directed toward providing context-sensitive writing assistance to a user that is composing a textual communication. The context is used to tune the writing assistance to accommodate the different communication styles used in different contexts. For example, the writing assistance may accept informal forms of communication when the audience for the communication is a friend. On the other hand, the writing assistance may be tuned to require the formal communications when the audience for the communication is a co-worker. Examples of textual communications include an e-mail, a text message, a blog entry, a microblog entry, and an instant message. Examples of writing assistance includes spell check, grammar check, and auto fill-in. Examples of context considered by embodiments of the present invention include the audience for the communication and the type of communication.

In one embodiment, the writing assistance is contextualized by selecting the dictionaries used by the writing assistance based on context. For example, the writing assistance may utilize only a standard English dictionary when the context indicates formal communications should be used. On the other hand, a slang dictionary may be selected in addition to the standard dictionary when the context indicates informal communications are appropriate.

In one embodiment, the appropriate formality level is determined by analyzing previous communications sent by the user or received from the audience. The audience may be a single person, groups of people, or the general public. The communication style may be stored in a user profile. The user profile could also designate certain words or a subset of words from a dictionary as appropriate. For example if a person sends messages to the user that include abbreviations or slang terms, then these individual terms used could be added to a dictionary that is specific to that particular user and the person. As used throughout, a dictionary is a group of words. The dictionary does not need to be a published dictionary and may or may not include definitions. A group of words may also be described as a corpus of words.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. Examples of stored information include computer-useable instructions, data structures, program modules, and other data representations. Media examples include information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
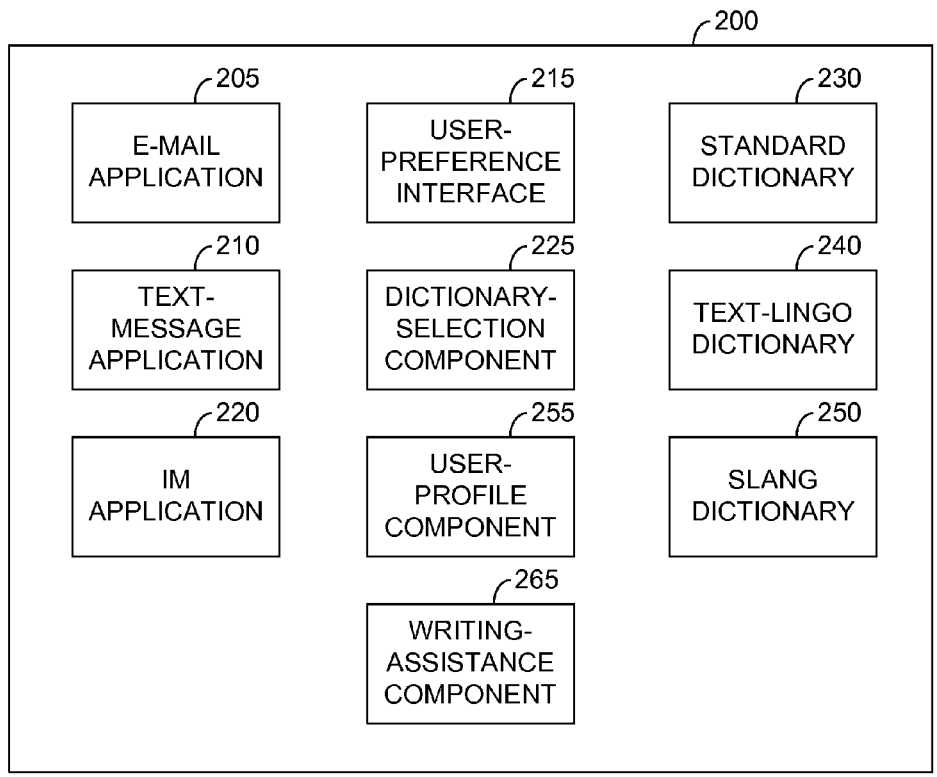
FIG. 2 is a drawing of, according to an embodiment of the present invention.

Turning now to FIG. 2, a block diagram depicts an exemplary computing-system architecture 200 suitable for providing context-sensitive writing. The exemplary computing-system architecture 200 should not be interpreted as having any dependency or requirement related to any single component or combination of components illustrated therein.

Exemplary computing-system architecture 200 includes an e-mail application 205, text-message application 210, instant-message application 220, dictionary-selection component 225, standard dictionary 230, text-lingo dictionary 240, slang dictionary 250, user-profile component 255, user-preference interface 215, and writing-assistance component 265. Exemplary computing-system architecture 200 can reside in a single computing device, for example, mobile device 100 described with reference to FIG. 1. In the alternative, exemplary computing-system architecture 200 may reside in a distributed computing environment that includes multiple computing devices coupled with one another via one or more networks.

The e-mail application 205 allows a user to compose an e-mail. The e-mail application 205 may also receive and store e-mails. The e-mail application 205 may be a standalone application or be integrated with a different application, such as a personal information management system. The e-mail application 205 may be a web-based e-mail application or installed on a personal computer, mobile device, or other computing device.

The text-message application 210 allows a user to generate text messages. The text-message application 210 may also allow a user to receive text messages. The text-message application 210 may reside on a computing device, mobile device, or other device used by a user. The text-messaging application 210 could be accessed over a web-interface communicated via the Internet.

The instant-messaging application 220 allows a user to generate an instant message. The instant-messaging application 220 may also allow a user to receive instant messages. The instant-messaging application 220 may reside on a local device used by a user or be accessed remotely by a user through a web-interface.

The dictionary-selection component 225 selects dictionaries for use by a writing-assistance application 265 based on context. The dictionary-selection component 225 determines the current context. The dictionary selection component 225 may interact with the user-profile component 255 to match the user's communication styles with the current context to choose appropriate dictionaries based on the context.

As stated, the dictionary-selection component 225 determines the context for the communication for which the writing assistance will be provided. Context includes the communication's medium and audience. In an embodiment where multiple writers use the same device, the dictionary-selection component 225 determines the drafter of the communication. The drafter is also referred to as the user or writer throughout this description. The audience may alternatively be referred to as recipients or a recipient. Thus, the audience, the communication medium, and the user all are part of the context for the writing assistance.

The standard dictionary 230 includes a plurality of words. In one embodiment, the standard dictionary 230 is a standard English dictionary. Embodiments of the present invention are not limited to English, and standard dictionaries for other languages may be used as a standard dictionary. In one embodiment, the standard dictionary does not include slang or informal terms and words.

The text-lingo dictionary 240 includes text lingo. The text-lingo dictionary 240 may also include a meaning of individual text-lingo terms. The definitions may be used by writing-assistance application 265 to convert a text-lingo term into standard language. The conversion could be literal or figurative. For example, the text-lingo term "LOL" stands for laugh out loud. The writing-assistance application 265 could convert LOL to its literal translation of "laugh out loud" or to a more figurative "that's funny."

The slang dictionary 250 includes informal words that are not included in the standard dictionary 230 and are not text lingo. The slang dictionary 250 may also serve as a personalized dictionary that includes terms that are frequently used in correspondence between a sender and a receiver. These terms could be abbreviations used in a particular industry or among friends. It could also be proper names, trademarks, and other terms that would generate an error by a writing-assistance application 265 when the term is not recognized as acceptable by the standard dictionary 230. While shown as three separate dictionaries, in one embodiment only a single group of words is utilized by the writing assistance. Rather than selecting certain dictionaries as a whole, certain words within the corpus of words are designated for use based on the context. The words within the corpus of words may be categorized as standard, personalized, slang, text lingo, related to a subject matter, and others. In this embodiment, when a user typically uses standard English in e-mail to the present audience, then all words designated as standard would be acceptable for use with the writing assistance.

The user-profile component 255 builds user profiles based on context. The user profile may be specific to a particular writer or user. In one embodiment, the user profile operates on a particular device or under a particular user profile and only contemplates a single user. In other embodiments, the user profiles are based on multiple users. As used herein, audience members are recipients of a present communication for which writing assistance will be provided. The communication profile for each audience member may be built based on communications sent to the audience member by a user or received from the audience member. A writer may use different communication styles in different contexts. For example, a writer may use one communication style when writing an e-mail to a friend (context 1) and a different communication style when writing a text message to the same friend (context 2). Similarly, the writer may use one communication style when writing an e-mail to his boss (context 3) and a different communication style when writing an e-mail to his friend (context 4). When determining a communication style, different weight may be given to different communications that are analyzed. In one embodiment, communications drafted by the user are given more weight than messages drafted by an audience member and sent to the user. In one embodiment, no weight is given to messages received from others. In other words, messages received from audience members are excluded from the contextual analysis. In other embodiments, less weight may be given to the messages received from audience members that are addressed to other writers in comparison to the weight given to messages received from the audience that were addressed to the present writer. Words occurring multiple times in communications between the writer and the audience member may be added to a dictionary or designated as acceptable for use in communications between these parties.

In addition to building an audience member specific profile, the user-profile component 255 will distinguish between different communication mediums. For example, a user profile could indicate that messages between a writer and a recipient in an e-mail medium generally used standard English and warrant formal writing assistance. On the other hand, messages between the same audience member and sender in the text-message medium may be suitable for informal writing assistance and utilize a text-lingo dictionary.

The user-preference interface 215 interfaces with the user profile component to allow a writer to specify one or more dictionaries used for a particular user or for a particular communication medium. For example, the user-preference interface 215 allows a writer to specify that only the standard dictionary should be used to provide writing assistance for all e-mails regardless of the audience for a particular e-mail. Similarly, a writer may specify that writing assistance provided for communications to a particular audience member or audience members should use only the standard dictionary 230. When only the standard dictionary 230 is utilized, then informal words would be detected as errors and the writer would have an opportunity to fix those errors.

The user-preference interface 215 also allows the user to set general defaults. For example, a default could allow text lingo and slang in all forms of communication. In this case, the user profile component 255 would initially set each individual audience member's profile to this default setting. As communications are analyzed the settings for a user profile of individual audience members could change from the default. The user-preference interface 215 could periodically generate confirmation messages when a profile for a particular audience member changes away from a default setting to confirm that the writer would like the setting to be changed for that particular audience member.

The writing-assistance component 265 provides writing assistance. Prior to providing writing assistance, the writing assistant component 265 receives or requests instructions regarding the types of words and grammar that are acceptable given the context. The types of writing assistance provided include spell check, grammar check, auto fill-in and other writing assistance features. These features are tailored to specific context based on the words, abbreviations, and terms the writing assistance is instructed to find acceptable.

Figure 3:
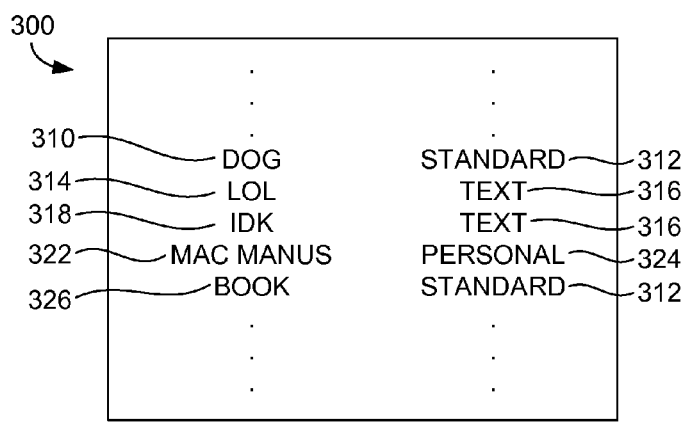
FIG. 3 is a drawing of a dictionary suitable for providing writing assistance, according to an embodiment of the present invention.

Turning now to FIG. 3, a corpus of words 300 used by a writing assistant component is shown, in accordance with an embodiment of the present invention. The corpus 300 includes a group of words. Only a small sample of words that could be in a corpus are shown in FIG. 3. The words shown in FIG. 3 include "dog" 310, "LOL" 314, "IDK" 318, "MacManus" 322, and "book" 326. Each word is associated with a category. The categories define a group to which the associated word belongs. The categories may correspond to a particular dictionary. FIG. 3 illustrates that multiple dictionaries could be a single file and words within the file could be associated with one or more dictionaries. In another embodiment, each dictionary is a separate file.

As can be seen, "dog" 310 is in a standard word 312 category. "LOL" 314 is categorized as text lingo 316. "LOL" in text lingo stands for laugh out loud. IDK 318 is also categorized as text lingo 316. In text lingo, "IDK" stands for I don't know. The word "MacManus" 322 is categorized as personal 324. Personal may indicate the word is associated with an individual user's dictionary. In this case, "MacManus" 322 is a proper name. Proper names may not be in a standard dictionary or text dictionary, but may be recognized by a writing assistance component by including it in a personal dictionary. The word "book" 326 is associated with the standard 312 category.

The corpus 300 lists words from multiple categories. In a different embodiment, each category of words is stored in a separate dictionary. In either embodiment, the categorization of words allows writing assistance to be provided based on context. Different categories of words are used by a writing-assistance component in different contexts.

Figure 4:
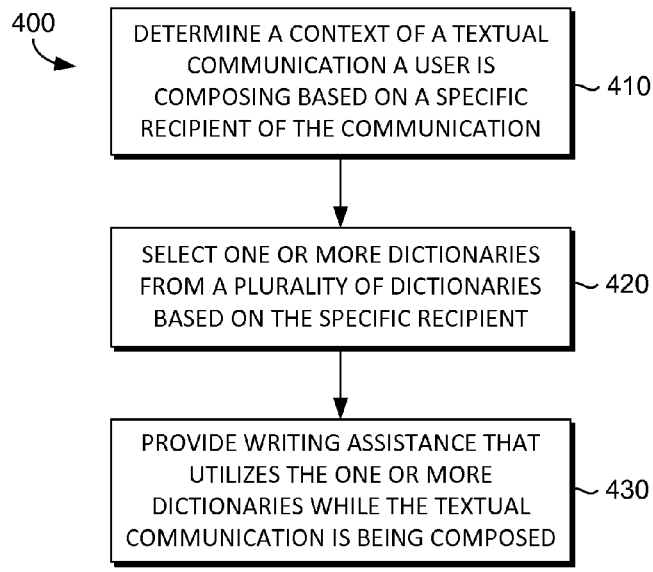
FIG. 4 is a flow diagram of a method of providing context-sensitive writing assistance, according to an embodiment of the present invention.

Turning now to FIG. 4, a method 400 of providing context-sensitive writing assistance is provided in accordance within an embodiment of the present invention. Examples of writing assistance provided include spell check, grammar check, and auto fill-in. At step 410, a context of a textual communication is determined based on a specific recipient of the textual communication. Examples of textual communications include e-mails, text messages, instant messages, blog entries, microblog entries, and updates to a personal webpage. The recipient can be a person, a distribution list of people, or a readership of a blog, microblog feed, or a webpage. For example, the recipients of a blog entry could be readers of the blog. These readers may not be specifically identifiable. Similarly, the readers of a webpage update may not be specifically identifiable. Nevertheless, as will be seen, previous communications to these audiences may be analyzed to determine the appropriate communication style for the writing assistance. The specific recipient may be an addressee in an e-mail, text message, or instant message. The specific recipient may be determined by analyzing the address line or lines in an e-mail, text message, or instant messaging application. In the case where the recipient is a readership, the specific recipient may be determined by recognizing a URL or other identifying information associated with a particular blog, microblog, or webpage. In one embodiment, the webpage is part of a social-networking website.

At step 420, one or more dictionaries are selected from a plurality of dictionaries based on the specific recipient. Examples of dictionaries include a standard dictionary, a slang dictionary, and a personal dictionary. These dictionaries have been described previously. In this case, the dictionaries are selected based on the specific recipient of the textual communication. In one embodiment, characteristics of previous communications involving the specific recipient are stored in a profile and used to select the one or more dictionaries. In another embodiment, the characteristics are summarized as a communication style for which the one or more dictionaries are appropriate. Communications that involve the specific recipient include communications received from the specific recipient and communications sent to the specific recipient from the user. The characteristics of these previous communications reveal the user's communication style when communicating with the specific recipient. For example, if previous communications use standard English words, without slang, then only the standard dictionary may be selected. Selecting a standard dictionary for use with the writing assistance tunes the writing assistance to standard English. Words that fall outside the standard English dictionary would be flagged, in certain instances, for the user's attention. In another example, if previous communications between the specific recipient and the user include text slang, and other personalized lingo, then selecting the text dictionary and personal dictionary in addition to the standard dictionary may be appropriate. In one embodiment, more weight is given to the characteristics of communications originating from the user and addressed to the specific recipient than is given to communications received from the specific recipient.

Embodiments of the present invention may take into account other factors when selecting dictionaries. For example, the medium of the textual communication may be taken into consideration. Thus, it may be appropriate to select only the standard English dictionary when the textual communication is an e-mail and both the text-slang dictionary and the standard dictionary, when the textual communication is a text message or instant message. Similarly, the user's communication style within other blog entries, microblog entries, and webpage updates may be considered when determining or selecting the one or more dictionaries. In one embodiment, the user is able to set default dictionaries for specific users and specific mediums for textual communications. When default settings are used, the dictionary may be selected based on the default settings.

At step 430, writing assistance that utilizes the one or more dictionaries is provided while the user is composing the textual communication. The writing assistance may be provided through an interface displayed to the user. The interface may be the same interface in which the message is being composed. For example, the writing assistance may be underlining a misspelled word, which occurs in the same interface in which the message is being composed. As described previously, the writing assistance may include spell check, grammar check, auto-correct, auto fill-in, and others. The writing assistance uses one or more dictionaries to determine whether individual words satisfy the rules within the writing assistance. For example, when a text-slang dictionary is within the one or more dictionaries used by the writing assistance, text slang will not show up as a misspelled or unknown word. In this manner, the writing assistance helps a user tailor their writing to the style of the specific recipient.

Figure 5:
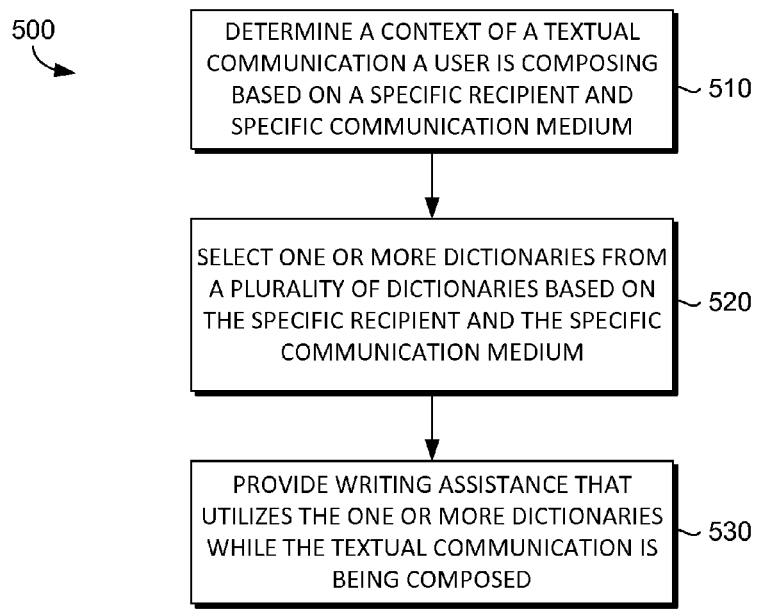
FIG. 5 is a flow diagram of a method of providing context-sensitive writing assistance, according to an embodiment of the present invention.

Turning now to FIG. 5, a method 500 of providing context-specific writing assistance is provided, in accordance with an embodiment of the present invention. At step 510, a context of a textual communication is determined based on a specific recipient of the textual communication and a specific communication medium of the textual communication. The specific recipient may be determined as described previously with reference to FIG. 4. Examples of communication mediums include a text message, e-mail, instant message, blog entry, microblog entry, and webpage update. The specific communication medium may be determined by the application in which the textual communication is composed, a URL, characteristics of a user interface through which the textual communication is being composed, and the address of the specific recipient. For example, if the address of the specific recipient is a phone number, then an assumption could be made that a text message is being composed. The specific communication medium may be determined very specifically. For example, a communication medium may be identified differently for different blogs. Thus, while the communication medium may be a blog entry, embodiments of the invention may distinguish between different blogs with which the entry is associated. For example, a user may want to differentiate their textual communication style when writing on a professional blog and a sports or news blog.

At step 520, one or more dictionaries are selected from a plurality of dictionaries based on the specific recipient and the specific communication medium. Thus, the dictionaries are selected based on the specific recipient and the communication medium. This allows different dictionaries to be selected for a text message sent to an individual recipient and an e-mail sent to the same individual recipient. Similarly, different dictionaries could be selected when an e-mail is sent to a first recipient as compared to when an e-mail is sent to a second recipient.

The choice of the one or more dictionaries may be made by reviewing a profile for the specific recipient. A profile is built by analyzing communications that occur between the specific recipient and the user. The profile distinguishes between different communication mediums and allows different dictionaries to be selected or associated with the user on a per-communication-medium basis. The profile may be built by analyzing communications received from and sent to the specific recipient. In one embodiment, more weight is given to communications sent to the specific recipient from the user than is given to messages received from the specific recipient. In another embodiment, only messages or textual communications sent to the specific recipient from the user are used to build the profile. The profile may initially have default settings for users for which there is no previous communications record. These defaults may change as a communication style is revealed through a series of communications. In one embodiment, the user is notified when the default setting for a new recipient is changed from the default and asked to confirm. In one embodiment, a user interface is provided for the user to go in and set defaults for dictionaries to be used for specific mediums, for specific recipients, and for specific recipients of a particular communication medium.

At step 530, writing assistance that utilizes the one or more dictionaries is provided while the user is composing the message. The writing assistance has been described previously. The selection of the one or more dictionaries will tune the writing assistance to the user's desired communication style.

Figure 6:
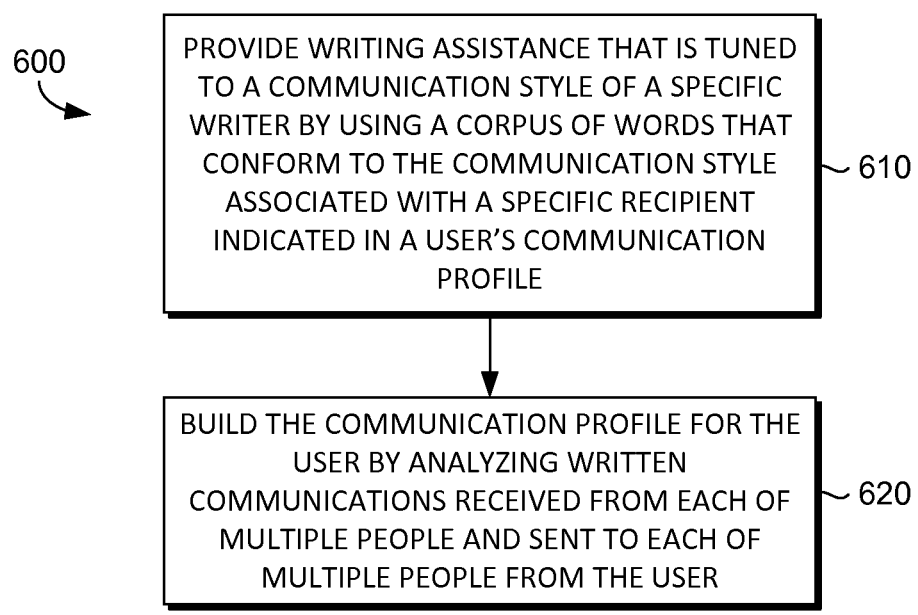
FIG. 6 is a flow diagram of a method of providing context-specific writing assistance, according to an embodiment of the present invention.

Turning now to FIG. 6, a method 600 of providing context-specific writing assistance is provided, in accordance with an embodiment of the present invention. At step 610, writing assistance is provided that is tuned to a communication style a writer uses in communications with a recipient of a textual communication. The communication style is associated with the recipient in the user's communication profile. The communication profile associates a corpus of words with each of multiple people with which the user communicates in writing.

At step 620 the communication profile is built by analyzing previous communications received from or sent to each specific user within the style profile. The corpus of words may be similar to a dictionary. In one embodiment, the corpus of words for each user starts with all words in a standard dictionary. In another embodiment, the corpus of words starts with a subset of words in a standard dictionary that are commonly used in communications. In one embodiment, the profile adds words to the corpus of words as those words are used in communications between the user and a specific recipient. For example, text slang, such as "LOL" may be added to the corpus of words as it is used in textual communications between a specific user and a recipient. In addition to adding words previously used to the corpus of words, similar words or categories of words may be added to the corpus of words based on words used in textual communications between the parties. For example, the use of one or more medical terms in a textual communication may cause all words categorized as medical terms to be added to the corpus of words. Similarly, the use of legal jargon may cause words associated with the law to be added to the corpus of words. Similarly, use of common text lingo may cause a group of common text lingo to be added to the corpus of words. This would not add all text lingo from a text-lingo dictionary to the corpus of words, only common text lingo. Use of less-common text lingo may cause the balance of text lingo from a text-lingo dictionary to be added to the corpus of words. Thus, the use of a single word that falls within a subject matter category of words, or dictionary, may cause additional words within that subject matter category to be added to the corpus of words. Dictionaries described previously may similarly be broken down to this level of granularity. For example, a standard dictionary may comprise only common words. A legal dictionary, medical dictionary, engineering dictionary, information technologies dictionary, or other category of words could be designated. Similarly, within these dictionaries, sub-dictionaries could be designated where common terms within these dictionaries are differentiated from uncommon terms in these dictionaries.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having computer-executable instructions embodied thereon that, when executed by a computing device, facilitate a method of providing context-specific writing assistance, the method comprising:

providing writing assistance that is tuned to a communication style of a writer of a textual communication presently being composed by the writer, wherein the writing assistance is tuned by using a corpus of words that conform to the communication style associated with a specific recipient in a communication profile of the writer, and wherein the communication profile associates a corpus of words with each of multiple people with which the user has previously communicated in writing; and building, by way of the computing device, the communication profile by analyzing written communications received from each of the multiple people and sent to each of the multiple people from the writer, wherein the communication profile gives more weight to the written communications sent to each of the multiple people, and wherein the communication profile associates different corpuses of words for different types of communication mediums on a per-recipient basis, thereby allowing the writing assistance to be tuned to the specific recipient and communication medium.

2. The non-transitory media of claim 1, wherein the writing assistance is at least one of spell check and autocomplete.

3. The non-transitory media of claim 1, wherein the corpus of words is selected from multiple corpuses of words, wherein each of the multiple corpuses of words is associated with a different level of communication formality.

4. The non-transitory media of claim 1, wherein the method further comprises modifying the communication profile based on input received by the writer, wherein the input associates a corpus of words with an individual recipient.

5. The non-transitory media of claim 1, wherein the method further comprising changing an association of the corpus of words to the specific recipient based on subsequent analysis of communications to and from the specific recipient only after receiving confirmation to make a change from the writer.

6. The non-transitory media of claim 1, wherein the communication profile is dynamically updated as communications are sent and received.

7. The non-transitory media of claim 1, wherein the communication profile has default settings for e-mail set to a standard language corpus and text messages set to a language corpus that includes text slang.

8. The non-transitory media of claim 1, wherein the method further comprises determining the specific recipient's communication style by analyzing text in one or more textual communications previously received from the specific recipient, wherein the specific recipient's communication style is used to determine the communication style.

9. The non-transitory media of claim 1, wherein the communication medium is one or more of a text message, an e-mail, a blog entry, a microblog entry, and a posting on a social website.

10. The non-transitory media of claim 1, wherein the corpus of words is built based on a selection of words from at least one of a standard language dictionary, a text-message slang dictionary, a legal dictionary, a medical dictionary, a slang dictionary, and a personalized dictionary.

11. A method of providing context-sensitive writing assistance, the method comprising:
providing writing assistance that is tuned to a communication style of a writer of a textual communication presently being composed by the writer, wherein the writing assistance is tuned by using a corpus of words that conform to the communication style associated with a specific recipient in a communication profile of the writer, and wherein the communication profile associates a corpus of words with each of multiple people with which the writer has previously communicated in writing; and
building, by way of a computing device, the communication profile by analyzing written communications received from each of the multiple people and sent to each of the multiple people from the writer, wherein the communication profile gives more weight to the written communications sent to each of the multiple people, and wherein the communication profile associates different corpuses of words for different types of communication mediums on a per-recipient basis, thereby allowing the writing assistance to be tuned to the specific recipient and communication medium.

12. The method of claim 10, wherein the communication profile associates different corpuses of words for different types of communication mediums on a per-recipient basis, thereby allowing the writing assistance to be tuned to the specific recipient and communication medium.

13. The method of claim 10, wherein the method further comprises building the communication profile based on words used in one or more messages received from the specific recipient, wherein the one or messages are in the specific communication medium.

14. The method of claim 10, wherein the method further comprises building the communication profile based on words used in one or more messages communicated to the specific recipient from the writer, wherein the one or more messages are in the specific communication medium.

15. The method of claim 10, wherein the method further comprises modifying the communication profile based on input received by the writer, wherein the input associates a corpus of words with an individual recipient.

16. The method of claim 10, wherein the corpus of words is selected from multiple corpuses of words, wherein each of the multiple corpuses of words is associated with a different level of communication formality.

17. The method of claim 10, wherein the method further comprising changing an association of the corpus of words to the specific recipient based on subsequent analysis of communications to and from the individual recipient only after receiving confirmation to make a change from the writer.

18. The method of claim 10, wherein the communication profile is dynamically updated as communications are sent and received.

19. The method of claim 10, wherein the communication medium is one or more of a text message, an e-mail, a blog entry, a microblog entry, and a posting on a social web site.

20. The method of claim 10, wherein the corpus of words is built based on a selection of words from at least one of a standard language dictionary, a text-message slang dictionary, a legal dictionary, a medical dictionary, a slang dictionary, and a personalized dictionary.

* * * * *